United States Patent [19]
Hauser

[11] 3,741,148
[45] June 26, 1973

[54] VEHICLE WITH TRANSMISSION AND POSITION INDICATOR

[75] Inventor: Hans Hauser, Fredericktown, Ohio

[73] Assignee: The J. B. Foote Foundry Co., Fredericktown, Ohio

[22] Filed: Sept. 9, 1971

[21] Appl. No.: 178,949

[52] U.S. Cl. ............................... 116/124 R, 74/473
[51] Int. Cl. ............................................. G09f 9/00
[58] Field of Search ................. 116/124 R, DIG. 20, 116/114; 74/473, 474, 475, 473 SW; 180/70 R, 1 F, 90

[56] References Cited
UNITED STATES PATENTS

| | | | |
|---|---|---|---|
| 2,732,905 | 1/1956 | Anderson et al. | 180/90 |
| 2,925,061 | 2/1960 | Thornburgh et al. | 116/124 R |
| 3,301,086 | 1/1967 | Williams et al. | 74/475 |
| 3,406,587 | 10/1968 | Brilando et al. | 74/475 |
| 3,554,158 | 1/1971 | Shimano | 116/124 R X |
| 3,595,351 | 7/1971 | Ishida | 116/124 R X |
| 3,605,520 | 9/1971 | Iorenz et al. | 74/473 SW |
| 3,613,815 | 10/1971 | Meylink | 180/70 R |
| 3,616,709 | 11/1971 | Malm | 74/473 R |

Primary Examiner—Louis J. Capozi
Attorney—Allen D. Gutchess, Jr.

[57] ABSTRACT

This invention relates to a lawn tractor with a multi-speed transmission mounted under an operator's seat, with a visual position indicator showing the operator the shift position of a shift member of the transmission. The position indicator is mounted in view of the operator, preferably near the steering wheel so as to be readily seen. The indicator has indicia corresponding to the shift positions of the transmission and has a pointer connected by a flexible wire to the shift member and movable therewith to indicate on the indicia the position of the shift member.

5 Claims, 9 Drawing Figures

INVENTOR
HANS HAUSER
ATTORNEY

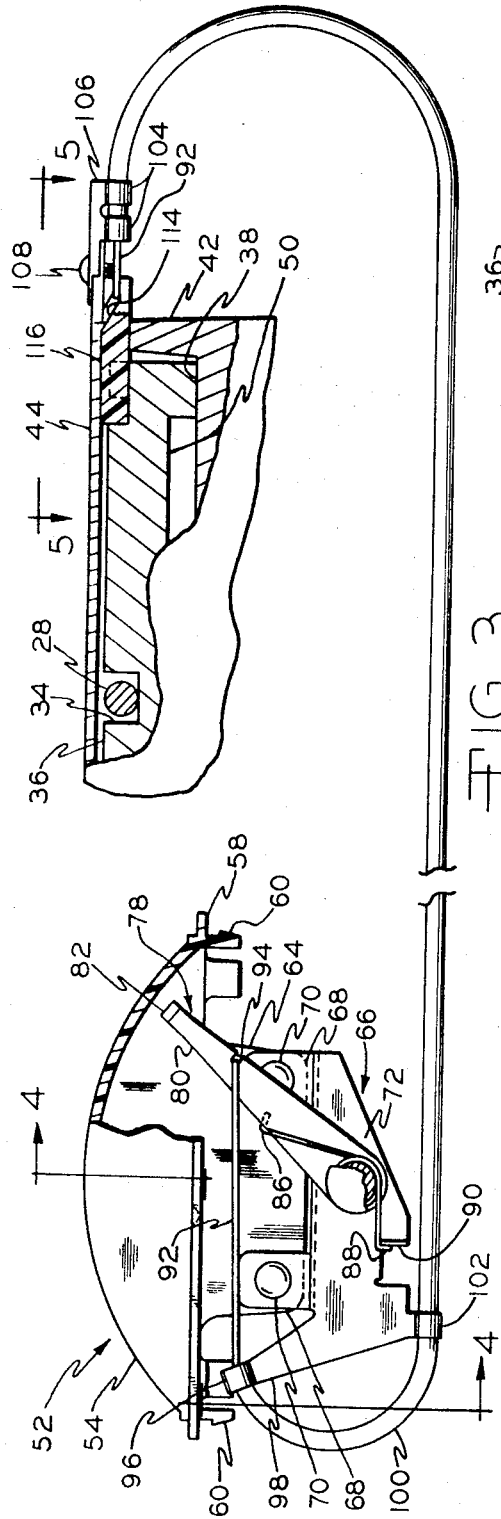
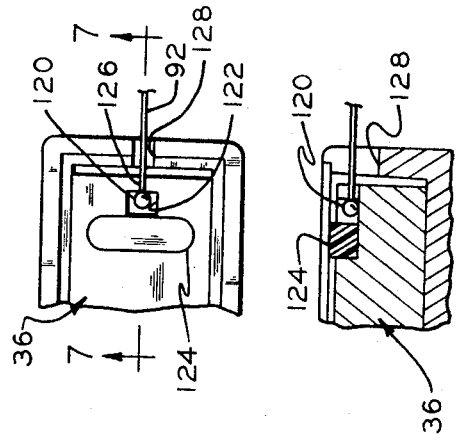
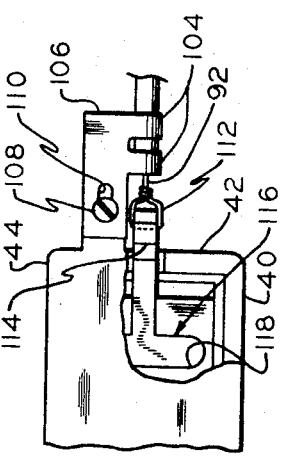
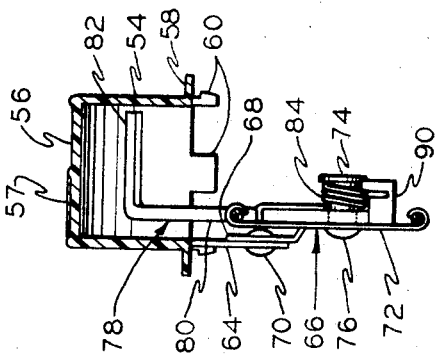

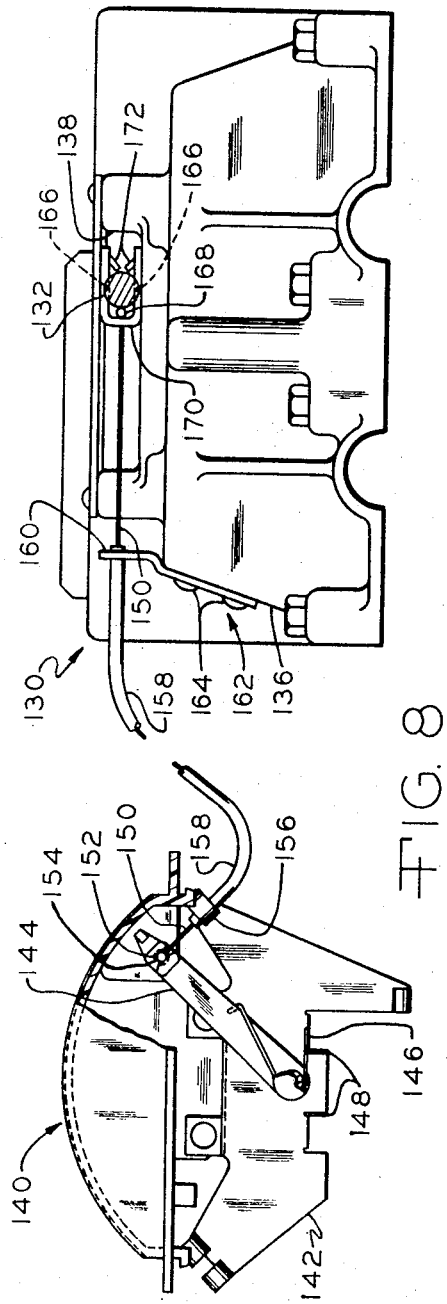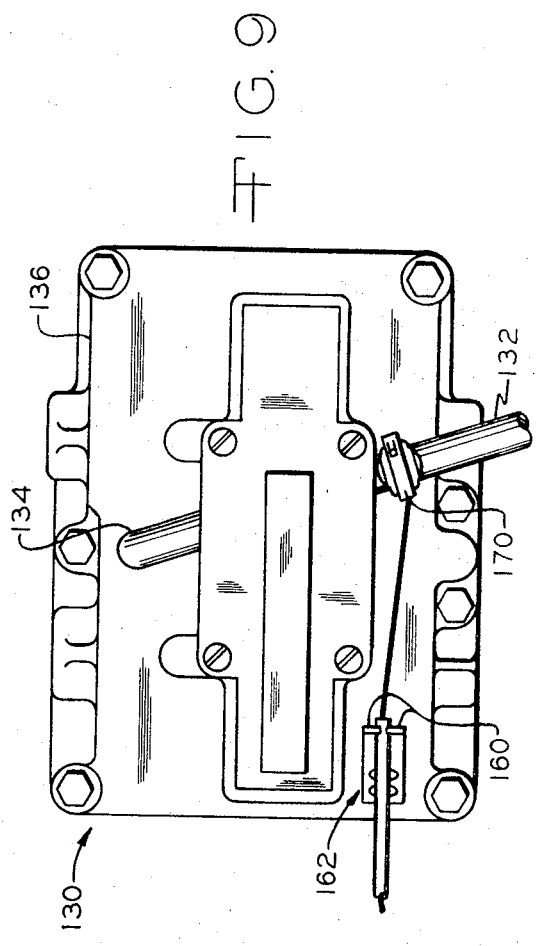

VEHICLE WITH TRANSMISSION AND POSITION INDICATOR

This invention relates to a position indicator for showing to an operator the shift position of a transmission mounted on a vehicle in a position not readily viewable by the operator.

It is becoming more common on riding vehicles, such as lawn tractors and lawn mowers, to mount the transmission under the operator's seat or in other positions in which the operator does not have direct visual access to the transmission. Particularly where such transmissions are shifted by a lineally movable shift member so that all positions of the transmission are in a single line, it is difficult for the operator to know which shift position the transmission is in. This is especially true when the transmission has at least two speeds forward in addition to a neutral position and usually a reverse position.

In accordance with the invention, a visual position indicator is employed with a transmission, particularly when located on a vehicle out of sight of the operator, to show the operator the exact shift position of the transmission. The indicator according to the invention preferably includes means forming a dial including indicia corresponding to the various shift positions of the transmission and a pointer movable relative to the dial to the position thereon corresponding to the shift position of the transmission. The pointer is connected by a flexible wire or cable to a lineally movable shift member of the transmission and is correspondingly moved when the flexible wire is pulled by the shift member in one direction. A spring is engaged with the pointer to urge the pointer in the opposite direction and correspondingly moves the pointer and pulls the flexible member in that direction when the shift member is so moved.

It is, therefore, a principal object of the invention to provide a transmission not readily seen by an operator with a position indicator to show the shift position to the operator.

Another object of the invention is to provide the combination of a transmission having a lineally movable shift member, and a position indicator including a spring-loaded pointer connected to the shift member by a flexible member and urged in one direction by the spring.

Other objects and advantages of the invention will be apparent from the following detailed description of a preferred embodiment thereof, reference being made to the accompanying drawings, in which:

FIG. 3 is an enlarged view in side elevation, with parts broken away and with parts in cross section, of part of the multi-speed transmission and the position indicator of FIGS. 1 and 2, with the transmission being in a different shift position;

FIG. 4 is a view in cross section taken along the line 4—4 of FIG. 3;

FIG. 5 is a fragmentary top view of a connection for a flexible wire connecting the transmission and the indicator, taken along line 5—5 of FIG. 3;

FIG. 6 is a fragmentary view, similar to FIG. 5, of a slightly modified connection for the flexible wire;

FIG. 7 is a fragmentary view in cross section taken along the line 7—7 of FIG. 6;

FIG. 8 is a view similar to FIG. 3 of part of a multi-speed transmission and a position indicator, but with a flexible wire between the two connected in different locations; and FIG. 9 is a plan view of the transmission and connection for the flexible wire shown in FIG. 8.

Figure 1:
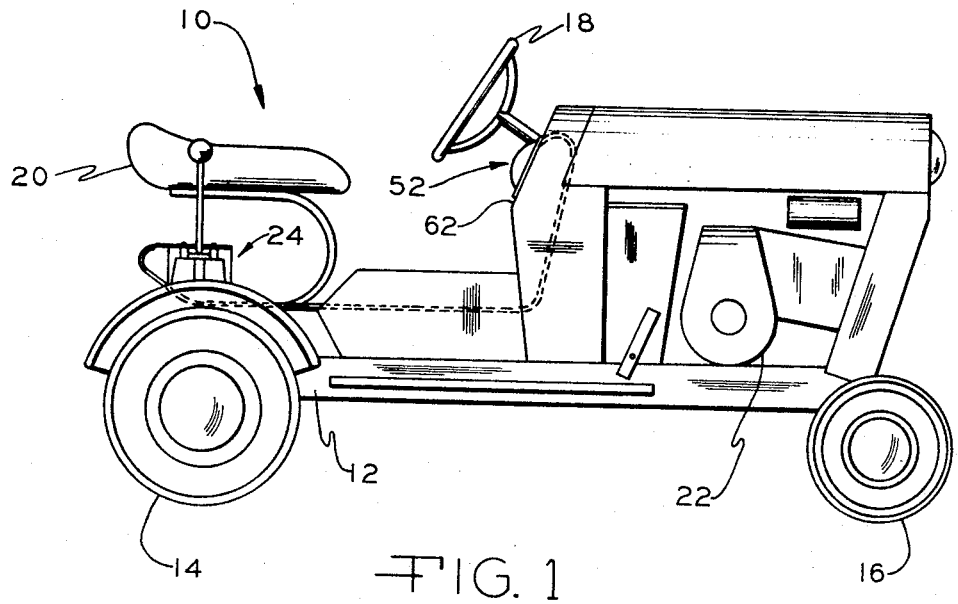
FIG. 1 is a somewhat schematic side view in elevation of a lawn tractor having a multi-speed transmission located out of direct sight of the operator, and a position indicator connected to the transmission and mounted within the sight of the operator.

Referring to FIG. 1, a lawn tractor 10 is representative of a typical vehicle involving the invention. The tractor 10 includes an inverted channel-shaped main frame 12 supported at the rear on rear wheels 14 and at the front by front wheels 16. The front wheels 16 are driven through a steering wheel 18 by an operator sitting on a seat 20. An internal combustion engine 22 drives the rear wheels 14 through a multi-speed transmission indicated at 24.

The transmission 24 is connected by a suitable belt drive (not shown) within the channel frame 12 to the engine 22. The transmission 24 has an output sprocket 26 which, in this instance, is driven in either of two speeds forward or reverse, or is in neutral, when the transmission 24 is being driven by the engine 22. The output sprocket 26 is connected to the rear axle or a differential for the rear axle of the wheels 14 through a chain (not shown). The transmission 24 preferably is located at the rear of the tractor to provide proximity with the rear axle and, consequently, is preferably placed below the operator's seat 20. The operator can then shift the transmission 24 between the reverse, neutral and forward speed positions through a shift lever 28 extending upwardly and terminating in a ball handle 30 adjacent the operator's seat. The lever 28 is pivotally mounted in a housing 32 of the transmission 24 and extends through a transverse notch 34 (FIG. 3) of a lineally movable shift member or slide block 36.

Figure 2:
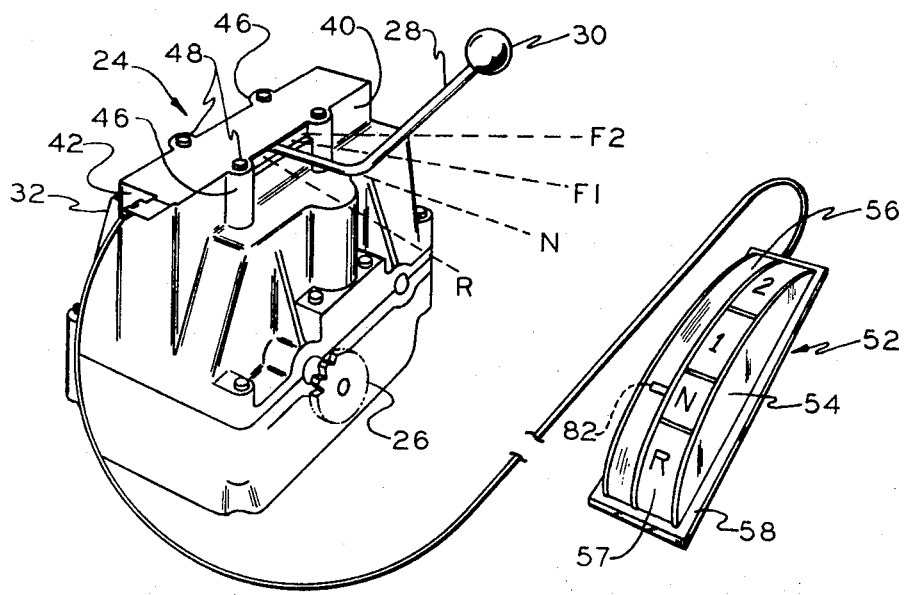
FIG. 2 is a somewhat schematic view in perspective of the multi-speed transmission of FIG. 1 and the position indicator.

The slide block 36 is located in a channel 38 formed in the upper part of the housing 32 by side walls 40 (FIG. 2) and an end wall 42. A cover plate 44 extends over the length and width of the channel 38 and is fastened to bosses 46 of the side walls 40 by fasteners 48. The slide block 36 has appropriately shaped grooves 50 in the lower surface thereof which receive pins of shifter forks which are then moved transversely when the slide block is lineally moved in the channel 38.

When the slide block 36 is in the rearmost position, as shown in FIG. 3, and the shift lever 28 is in the corresponding position, the transmission 24 is in reverse. When the slide block and the lever 28 are in the next forward position, as shown in solid lines in FIG. 2, the transmission is in neutral. In the next forward position of the lever 28, the transmission is in the first speed forward; and in the foremost position, the transmission is in the second speed forward. When the slide block is in any one of the four positions, it is detained in that position by a detent and recess arrangement (not shown) as is well known in the art. The details of the transmission do not constitute part of the invention and are not discussed at length. The transmission is disclosed more fully in my U.S. Letters Patent No. 3,426,611.

Since the transmission 24 cannot be seen by the operator, other than the lever 28, it is frequently difficult to determine which of the four positions, and particularly the intermediate ones, the transmission is in. To overcome this problem, a visual position indicator 52 according to the invention is provided. The indicator 52 includes a plastic housing 54 having a transparent strip 56 in an arcuate upper portion thereof with adjacent indicia indicating the shift positions of the transmission 24, in this case reverse, neutral, and first and second speeds forward. These are located on an indicia strip or tape 57 adjacent the transparent strip 56. If desired, the entire housing 54 can be transparent except for the indicia tape. In this instance, the housing 54 further includes outwardly extending base flanges 58 with depending hooks or barbs 60 to enable the housing 54 to be snapped into a rectangular opening in a dash panel 62 (FIG. 1) of the tractor 10. However, various other means of mounting the indicator 52 within the operator's sight can be employed.

The housing 54 also has an integral depending mounting flange 64 to which a mounting bracket 66 is attached by ears 68 and suitable rivets or fasteners 70. The bracket 66 has a main mounting plate 72 to which a pivot cylinder or pin 74 is affixed by a rivet 76, the pivot cylinder 74 being located at the center of curvature of the arcuate strip 56. A pointer 78 is pivotally mounted on the pivot cylinder 74 and includes a main upwardly extending arm 80 and a cross arm 82 which is visible through the strip 56 adjacent the indicia for the transmission shift positions. A torsion spring 84 is also mounted on the pivot cylinder 74 and has an upper end 86 engaged with the pointer arm 80 and a second end 88 engaged with an ear 90 bent out of the mounting plate 72. The spring thereby urges the pointer 78 in a clockwise direction, as shown in FIG. 3, toward the reverse position indicia.

Flexible elongate means are employed to connect the pointer 78 with the slide block 36. As shown, this is specifically in the form of a cable or wire 92 engaged in a notch 94 of the pointer arm 80 and extending forwardly to a mounting loop 96 formed at the end of a projection 98 of the bracket 66, at the forward end of the indicator 52. At this point, the wire 92 is encased by a sheath 100 which protects the wire back to the transmission. A second loop 102 also engages the sheath 100 at the lower end of the bracket 66. At the transmission, the sheath 100 is held by two loops 104 formed by a bracket 106 which is affixed to a rear portion of the cover 44 by a fastener or screw 108. The bracket 106 can be adjusted longitudinally of the slide block 36 by means of a slot 110 to enable correct initial adjustment of the indicator 52 relative to the slide block 36. In this instance, the wire 92 is formed into a loop 112 which is engaged in a notch 114 of a T-shaped connecting member 116. The T-shaped member 116 preferably is of a plastic material and is held in a correspondingly shaped recess 118 in the slide block 36. However, the member 116 extends above the upper surface of the slide block 36 to engage the cover 44 and provide a bearing for the slide block.

A modified means of connecting the wire 92 to the slide block 36 is shown in FIGS. 6 and 7. Here, the wire 92 has a ball 120 swaged thereon and located in a recess 122 of the slide block adjacent a separate plastic bearing member 124. The wire 92 extends from the recess 122 through a small notch 126 in the slide block and through a notch 128 in the rear end wall 42. The sheath for the wire can be held by a bracket (not shown) similar to that of FIGS. 3 and 5.

Referring to FIGS. 8 and 9, a slightly modified transmission 130 has two speeds forward, reverse, and neutral, and can be located at the rear of the vehicle and preferably below the operator's seat. The transmission 130 has a slightly modified shift lever 132 which can have an upwardly extending portion terminating in a handle near the operator's seat. The lever is pivotally mounted at 134 in a housing 136, similarly to the lever 28 but pivoted on the opposite side of the transmission housing and extending in the opposite direction. The lever 132 extends through an elongate opening 138 where it is engaged in a notch of a lineally movable shift member or slide block (not shown) similar to the notch 34 of the slide block 36. The slide block for the transmission 130 can have the same shift positions as the slide block 36 and it can also have an additional forward speed, if desired.

A visual position indicator 140 is similar to the indicator 52 except as discussed below. The indicator 140 has a modified mounting bracket 142 on which is pivotally mounted a modified pointer 144. This pointer is engaged by a torsion spring 146 which also engages one of two ears 148 bent out of the plate 142 to urge the pointer 144 in a counterclockwise or forward direction, as shown in FIG. 8.

Flexible elongate means are employed to connect the pointer 144 with the transmission 130. Accordingly, a cable or wire 150 is connected to the pointer 144 by a stud 152 and a clip 154 which enable the cable to be connected to the pointer from either direction. The wire 150 extends rearwardly in this instance to a mounting loop 156 at the rearward end of the indicator 140. At this point, the wire 150 is encased by a sheath 158 which is engaged by the loop 156 to hold the forward end of the sheath 158 in a fixed position.

At the transmission, the sheath 158 is engaged by bifurcated arms 160 of a bracket 162 affixed to the forward end of the housing 136 by fasteners or rivets 164. The bifurcated arms 160 can be squeezed together after the sheath 158 is in the proper position to securely hold the sheath in place. The wire 150 extends rearwardly from the bracket 162 to the shift lever 132, and specifically to a pair of flats or grooves 166 coined or swaged in an intermediate portion of the lever 132. The wire 150 has a ball 168 swaged or suitably affixed to the terminus thereof, by means of which the wire is connected to a U-shaped mounting bracket or clamp 170. The bracket 170 can be made of spring steel and has projections or ears 172 which hold the bracket 170 on the shift lever 132 and specifically in the flats or grooves 166.

The position indicator 140 and the associated mounting arrangement functions the same as the previous embodiment. The difference here is that the flexible wire 150 can be connected at the forward or rearward end of the indicator 140 with the torsion spring 146 selected to urge the pointer 144 in a direction away from the sheath 158. The wire 150, in turn, is connected to the shift lever rather than to the slide member of the transmission. It will be readily appreciated that the bracket 162 can be affixed to the rear of the housing 136 as well as to the forward portion, as shown.

While the indicator has been described in connection with a garden tractor and a transmission having two forward speeds, it can be employed with equal advantage with other vehicles and transmissions.

Various modifications of the above described embodiments of the invention will be apparent to those skilled in the art and it is to be understood that such modifications can be made without departing from the scope of the invention, if they are within the spirit and the tenor of the accompanying claims.

I claim:

1. In combination, a power-driven vehicle, a multi-speed transmission mounted on said vehicle in a position not readily visible to an operator of the vehicle, said transmission having shifting means including a movable shift member and a shift lever pivotally mounted on said transmission and engaged with said shift member for moving the shift member among a plurality of positions by pivotal movement of said shift lever, a position indicator including a position dial mounted on said vehicle in view of the operator, said dial having indicia corresponding to the positions of said shift member, a pointer, means movably supporting said pointer relative to said dial, a flexible cable having an end connected to said pointer, bracket means connecting the opposite end of said cable to said shift lever adjacent said shift member, and supporting means mounted on said transmission for supporting a portion of said flexible cable adjacent an end of the path of pivotal movement of said shift lever, said shifting means causing said pointer to move relative to said dial when said shift lever moves to indicate to the operator the position of said shift member.

2. The combination according to claim 1 characterized by said shift member being movable in a lineal path among the plurality of shift positions.

3. The combination according to claim 1 characterized by said transmission being mounted under a seat for the operator and said indicator having means enabling it to be mounted near a steering wheel for the vehicle.

4. In combination, a power-driven vehicle, a multi-speed transmission mounted on said vehicle under the seat for the operator so that the transmission is not readily visible to an operator of the vehicle, said transmission having shifting means including a lineally movable shift member and a shift lever pivotally mounted on the top of said transmission and engaged with said shift member for moving said shift member lineally among a plurality of positions when the shift lever is pivoted, a position indicator including a position dial and means mounting said indicator on said vehicle in view of the operator, said dial having indicia corresponding to the positions of said shift member, a pointer means movably supporting said pointer relative to said dial, a flexible cable including a flexible wire surrounded throughout most of its length by a flexible sheath, said wire connecting said pointer and said shifting means to cause said pointer to move relative to said dial when said shift member is moved by said shift lever, to indicate to the operator the position of said shift member, means supporting an end portion of said sheath on said transmission to enable the position of said cable to be moved relative to said transmission, and means mounting an end portion of said sheath on said indicator.

5. The combination according to claim 4 characterized by bracket means connecting said flexible cable to said shift lever near said shift member.

* * * * *